(12) United States Patent
Sutton et al.

(10) Patent No.: US 12,640,376 B2
(45) Date of Patent: May 26, 2026

(54) PROPRIETARY CURE MODULE AND METHOD FOR IMPREGNATING GRAPHITE

(71) Applicant: Godfrey & Wing, LLC, Aurora, OH (US)

(72) Inventors: Troy Sutton, Aurora, OH (US); Adam Haviland, Aurora, OH (US)

(73) Assignee: Godfrey & Wing, LLC, Aurora, OH (US)

(*) Notice: Subject to any disclaimer, the term of this patent is extended or adjusted under 35 U.S.C. 154(b) by 73 days.

(21) Appl. No.: 18/464,831

(22) Filed: Sep. 11, 2023

(65) Prior Publication Data

US 2024/0088401 A1     Mar. 14, 2024

Related U.S. Application Data

(60) Provisional application No. 63/405,421, filed on Sep. 10, 2022.

(51) Int. Cl.
H01M 4/88          (2006.01)
H01M 8/0284       (2016.01)

(52) U.S. Cl.
CPC ........... H01M 4/88 (2013.01); H01M 8/0284 (2013.01)

(58) Field of Classification Search
CPC ............................. H01M 8/0284; H01M 4/88
See application file for complete search history.

(56) References Cited

U.S. PATENT DOCUMENTS

| | | | |
|---|---|---|---|
| 4,147,821 A | 4/1979 | Young | |
| 4,662,940 A | 5/1987 | Monier | |
| 5,416,159 A | 5/1995 | Juday | |
| 6,712,910 B1 | 3/2004 | Newberth, III et al. | |
| 6,850,810 B1 | 2/2005 | Wang et al. | |
| 10,995,219 B2 | 5/2021 | Bailey et al. | |
| 2002/0068211 A1 | 6/2002 | Inoue et al. | |
| 2002/0160250 A1* | 10/2002 | Woods ................ | H01M 8/0263 428/408 |
| 2003/0049378 A1* | 3/2003 | Fong ................... | H01M 8/0223 427/337 |

(Continued)

FOREIGN PATENT DOCUMENTS

| | | |
|---|---|---|
| CN | 113429513 A | 9/2021 |
| CN | 113737137 A | 12/2021 |

(Continued)

OTHER PUBLICATIONS

Patent Cooperation Treaty, International Search Report and Written Opinion, PCT Application No. PCT/US2023/073871, dated Dec. 26, 2023.

(Continued)

*Primary Examiner* — Kelly M Gambetta

(74) *Attorney, Agent, or Firm* — Sand, Sebolt & Wernow Co., LPA

(57)          ABSTRACT

A device and method for curing solvent-impregnated (or saturated) graphite parts includes a cure module, wherein graphite parts saturated with a sealant are positioned in the cure module. Water is then placed in the cure module until the graphite parts are immersed in the water. The cure module is then pressurized to between 1 bar-20 Bar or more and the temperature of the water is maintained at any temperature from 90° C.-225° C. or more.

21 Claims, 5 Drawing Sheets

(56) References Cited

U.S. PATENT DOCUMENTS

| 2004/0166392 | A1 | 8/2004 | Shah et al. |
| 2009/0000732 | A1 | 1/2009 | Jacobine et al. |
| 2009/0098431 | A1 | 4/2009 | Yasumura et al. |
| 2009/0162718 | A1 | 6/2009 | Extrand |
| 2010/0242542 | A1 | 9/2010 | Hessenkemper |
| 2016/0167135 | A1 | 6/2016 | Hwang et al. |
| 2017/0312725 | A1 | 11/2017 | Worsley et al. |
| 2018/0346706 | A1 | 12/2018 | Jin et al. |
| 2020/0399501 | A1 | 12/2020 | Cerecke |
| 2021/0008859 | A1 | 1/2021 | Inata |

FOREIGN PATENT DOCUMENTS

| GB | 2216136 | A | 10/1989 |
| JP | 2000243409 | | 9/2000 |
| WO | 2019161006 | A1 | 8/2019 |

OTHER PUBLICATIONS

Patent Cooperation Treaty, PCT International Search Report & Written Opinion in PCT Application No. PCT/ US2024/023542 dated Aug. 5, 2024.
Patent Cooperation Treaty, International Search Report & Written Opinion received in Application No. PCT/ US2024/016226, dated Jun. 20, 2024.
Patent Cooperation Treaty, International Search Report & Written Opinion Received in Application No. PCT/US2023/035224 mailed Jan. 25, 2024.
Shore Hardness Scale Comparison Chart, Pad Print Machinery of Vermont.

* cited by examiner

PROPRIETARY CURE MODULE AND METHOD FOR IMPREGNATING GRAPHITE

CROSS-REFERENCE TO RELATED APPLICATIONS

This application claims priority to U.S. Provisional Application No. 63/405,421 entitled Proprietary Cure Module and Method for Impregnating Graphite, filed on Sep. 10, 2022, the contents of which are no inconsistent with this application are incorporated by reference herein.

BACKGROUND

Impregnated graphite plates are used in fuel cells. To obtain a graphite plate with the proper characteristics, the graphite plate must be impregnated (or saturated) with a sealant and then cured to create the final plate (or "finished plate"). Other graphite pieces (or "parts") are also impregnated and cured. This process currently takes about forty-five minutes to six hours depending upon the thickness, shape, size, and type of graphite, so a production facility must include a significant number of machines (or curing stations) to achieve high-production, finished graphite plate output.

"Graphite pieces" or "graphite parts" means any part that is formed from new graphite, including but not limited to sheets, gears, plates, bushings, electrical circuits, or others. As used herein, cross linking, cross polymerization, and curing are used interchangeably to mean curing a liquid sealant into a solid. As used herein, "sealant," "resin," and "polymer" are used interchangeably.

SUMMARY

Disclosed is a device (or system) and method that reduces the cure time to create a finished graphite piece from about forty-five minutes to six hours to less than 45 minutes and as low as about ten minutes, or even less. The device and method of this disclosure performs graphite impregnation and curing utilizing a four module machine in which each module is preferably loaded from the front rather than from the top or a side. The device preferably has four modules: (1) a vacuum impregnation module in which graphite pieces are impregnated with a solvent, (2) a rinse module in which the impregnated graphite pieces are rinsed with water to remove excess solvent from the outer surfaces of the pieces, (3) a wash module in which the graphite pieces are washed, such as with water and surfactant, to further remove excess solvent from the outer surfaces of the pieces, and (4) a cure module in which the sealant inside of the graphite pieces is cured. In the cure module, the uncured, impregnated graphite pieces are placed inside of a first chamber, which in the embodiment disclosed is an upper chamber. A heating medium, such as oil, another suitable liquid, or most preferably water, is then moved into the first chamber so the graphite pieces are completely immersed. The water is preferably introduced at a temperature of about 85° C.-95° C., or 90° C.-95° C., or 95° C.-100°, although it could be introduced at any suitable temperature.

In this embodiment, the water is moved from a second chamber (also called a lower chamber) by pressurizing the second chamber, which causes the water to move from the second chamber, through a pipe or other conduit, into the first chamber in which the impregnated, graphite pieces are present. The graphite pieces are then immersed in the water. The first chamber is then pressurized so the water temperature can be raised to or above its boiling temperature of 100° C. at atmospheric pressure (1 Bar).

Aspects of this disclosure include maintaining the pressure in the first chamber at any amount from 1.0 Bar to 20 Bar or more while increasing/maintaining the water temperature to any amount from 90° C. to 225° C. or more, in order to cure the sealant in the graphite pieces. As non-limiting examples, the pressure could be increased by any amount from 1.1 Bar to 20 Bar, or any amount greater than 20 Bar, and the temperature of the water could be increased from any amount from 100° C. to 225° C., or any amount greater than 225° C.

The sealant is preferably a methacrylate-based monomer that is thermally cured. It preferably, although not necessarily, has a viscosity of 12 centipoise and contains no acid. It may include a trifunctional monomer.

DETAILED DESCRIPTION

Turning to the Figures, wherein the purpose is to describe preferred embodiments of this disclosure and not to limit the scope of the claims.

Figure 1:
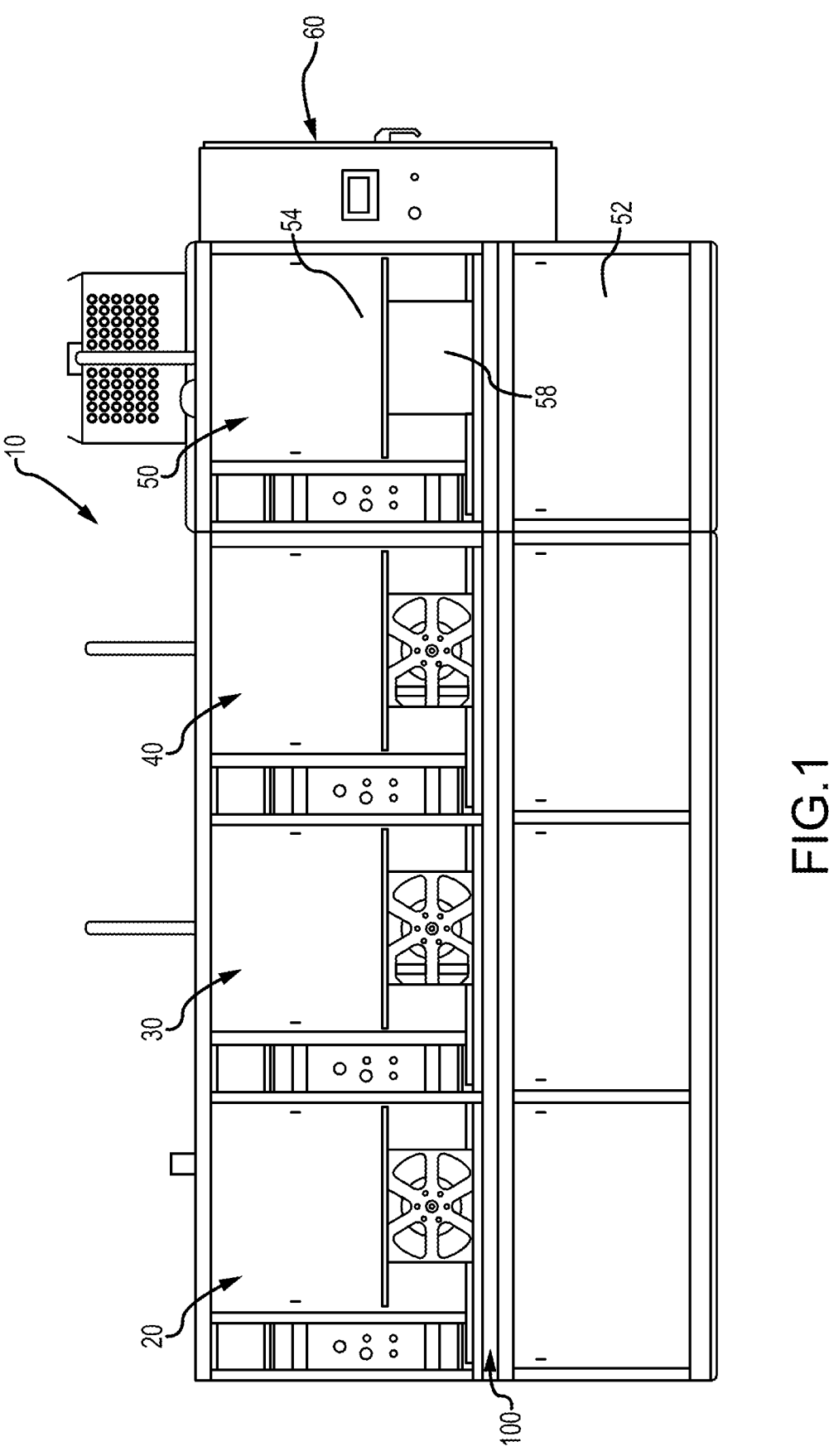
FIG. 1 is a front view of a device according to this disclosure.
Figure 2:
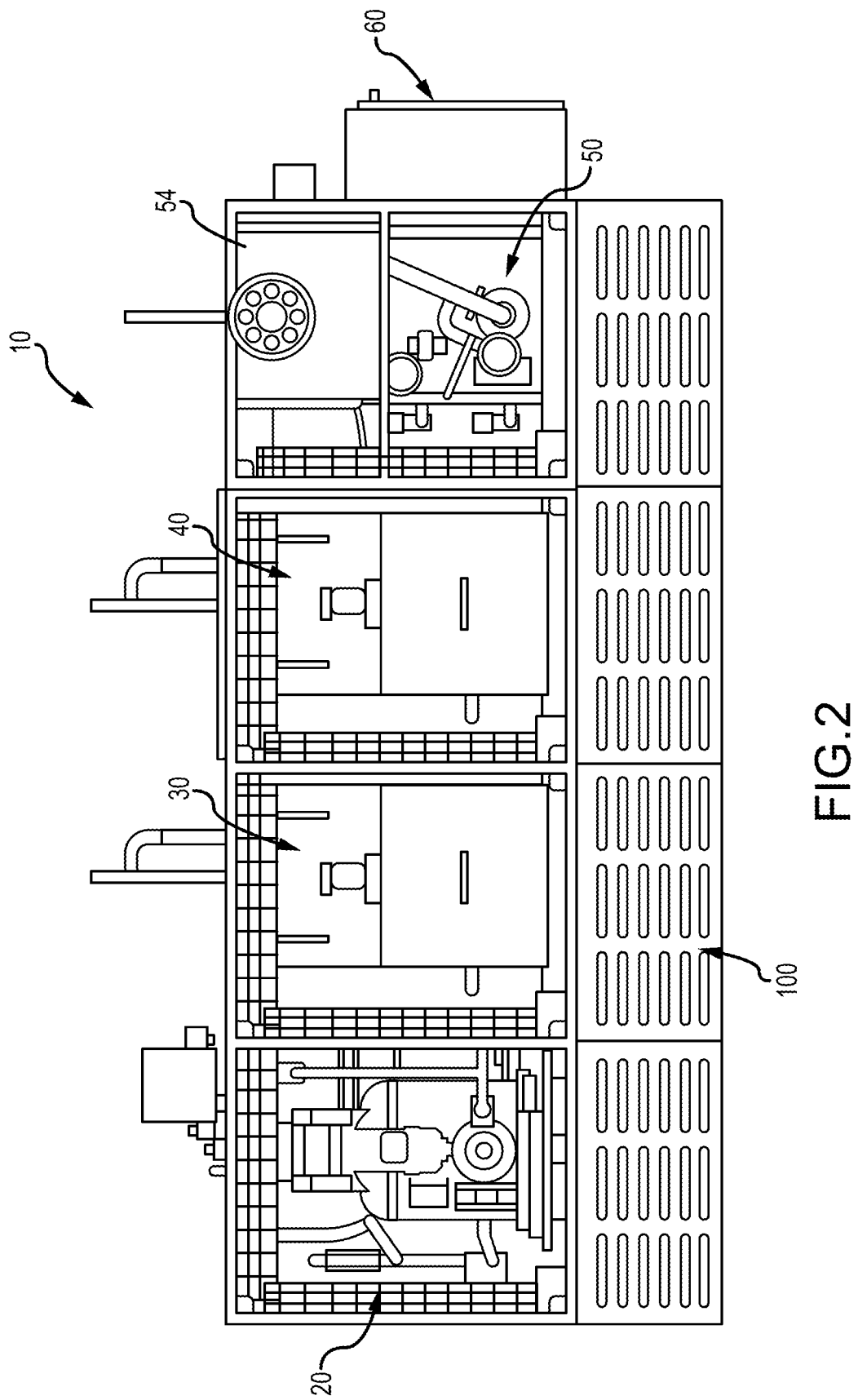
FIG. 2 is a top view of a device according to this disclosure.
Figure 3:
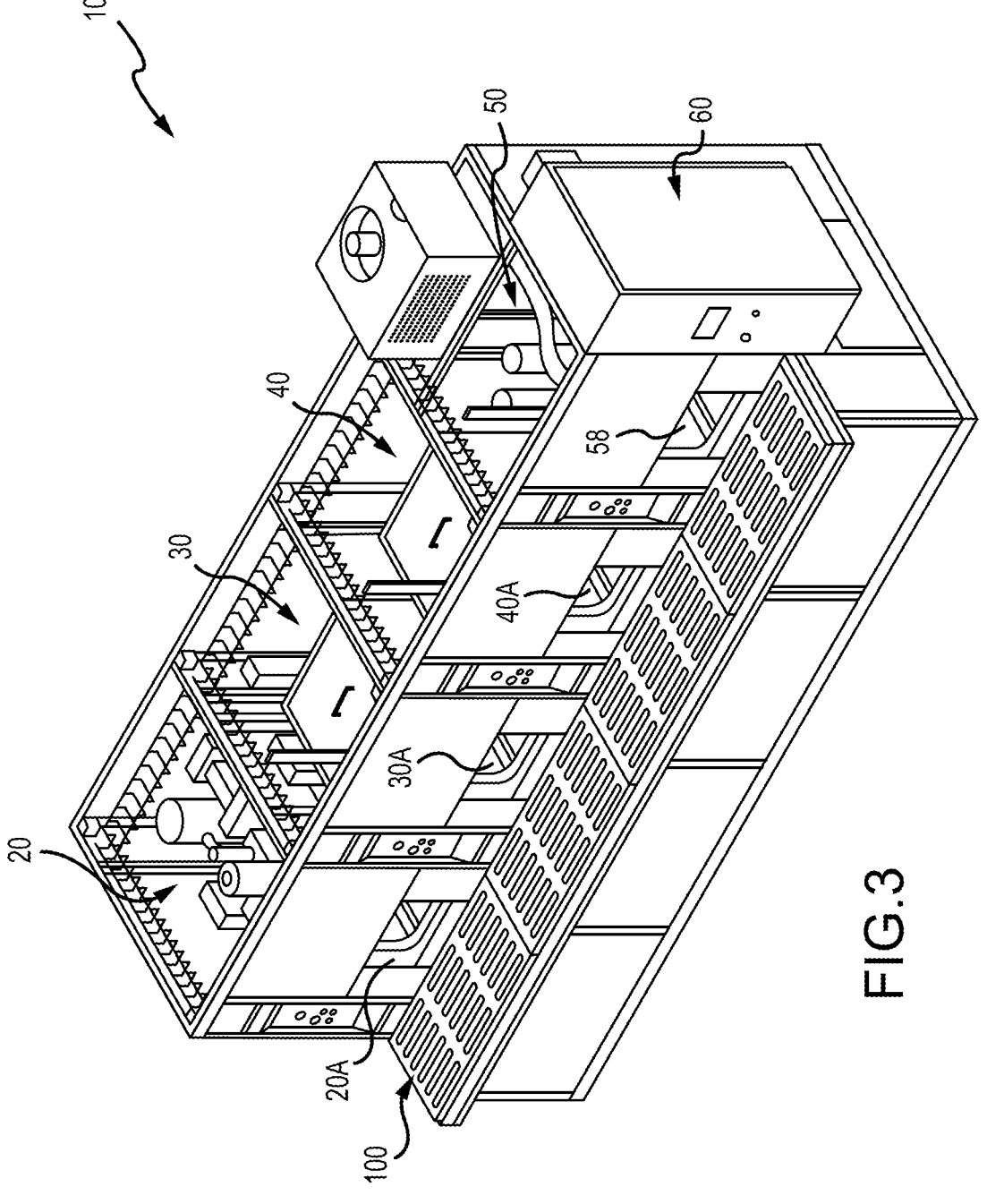
FIG. 3 is a front perspective view of a device according to this disclosure.
Figure 4:
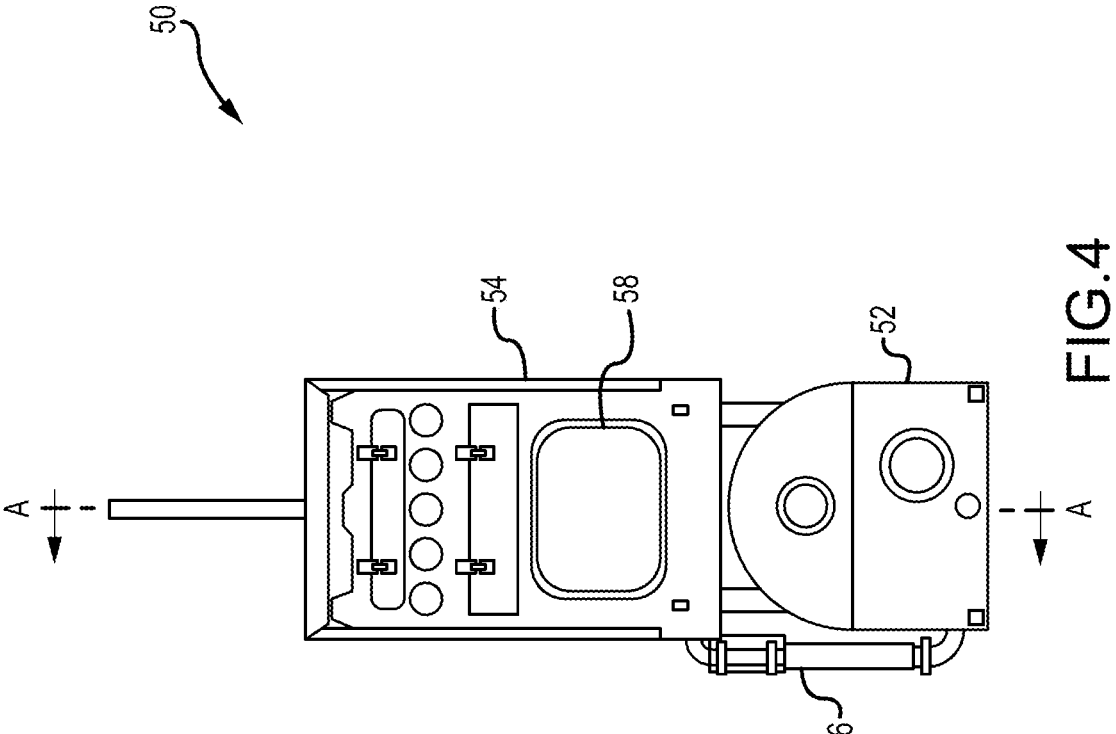
FIG. 4 is a front view of a cure module according to this disclosure.
Figure 5:
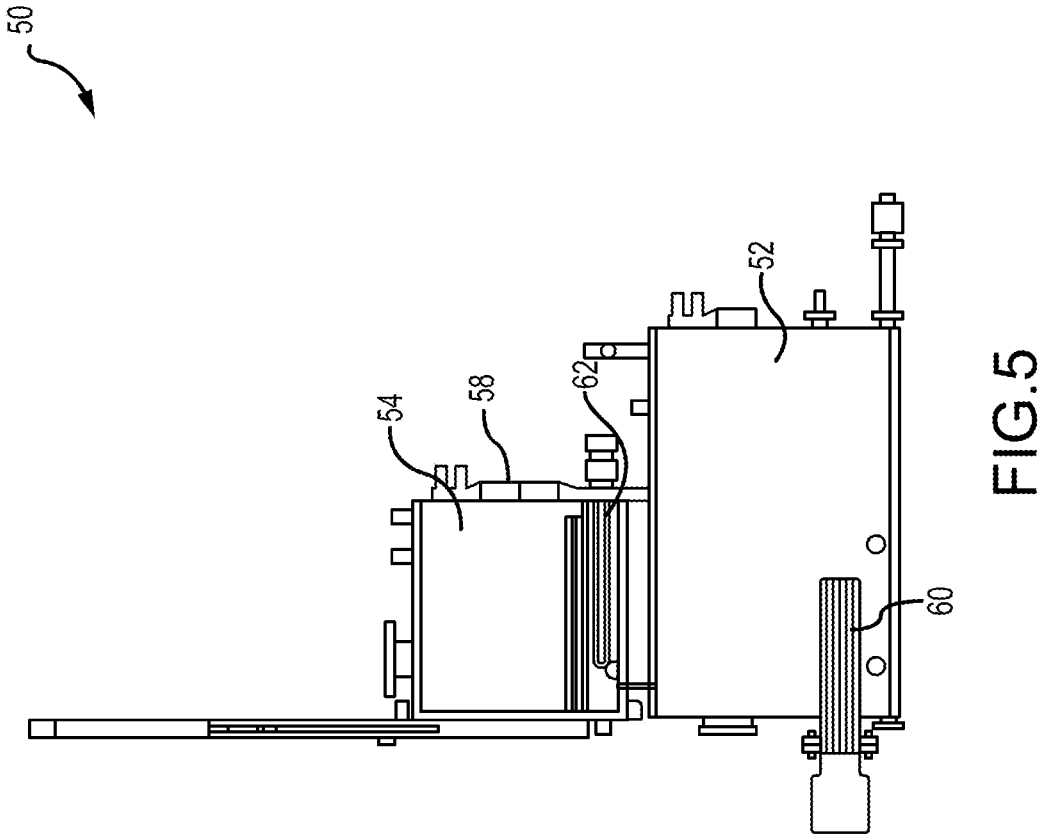
FIG. 5 is a side, cross-sectional view of a cure module according to this disclosure taken through line A-A of FIG. 4.

FIGS. 1-3 illustrate a device/system 10 according to aspects of this disclosure. The device shown comprises four modules: (1) an impregnation module 20, (2) a rinse module 30, a wash module 40, and a cure module 50. Each of modules 20, 30, 40, and 50 is preferably front loading with respective doors 20A, 30A, 40A and 58. A transfer deck 100 is preferably positioned in front of each of the modules 20, 30, 40, and 50 so containers (also referred to herein as "baskets" or "carriages") of graphite parts (also called pieces), such as graphite plates for fuel cells, are moved in and out of each of the modules 20, 30, 40, 50 through a door in the front of each module, and are moved from one module to another along the transfer deck 100.

The functions and operating conditions of the vacuum impregnation module 20, rinse module 30, and wash module 40 are described herein and are generally known in the art. One of rinse module 30 and wash module 40 need not be utilized. The raw (prior to being impregnated) graphite parts are first loaded into module 20 through door 20A, and door 20A is closed and sealed so that it is watertight during the process described herein. Then the graphite parts are immersed in sealant by moving the sealant from a separate vessel of module 20, which may be a lower vessel, into the part of module 20, which may be the upper vessel, in which the graphite parts are positioned. Vacuum is first drawn on the raw graphite parts to remove air from their pores. Then, liquid sealant is moved into module 20 by the vacuum, which draws the sealant into the part of module 20 in which the graphite parts are located, and the vacuum draws the sealant into the graphite parts. The graphite parts are immersed in the liquid sealant and the chamber including the graphite parts and sealant is then over-pressured to 1 Bar or greater in order to help saturate or impregnate the graphite parts with the liquid sealant. The liquid sealant preferably has two components, which are a monomer and an activator that causes the monomer to crosslink (also called cure).

When the graphite parts are sufficiently impregnated with sealant, the over pressure is removed so the pressure returns to atmospheric, excess sealant is collected, and the container with the graphite parts is moved out of vacuum impregnation module 20. The container is then moved along transfer deck 100 and positioned into rinse module 30 through a door 30A at the front of the module 30. The door to rinse module 30 is then closed and water is used to rinse excess sealant off of the surfaces of the graphite parts.

After rinsing, the graphite parts are moved along transfer deck 100 to wash module 40 and loaded into module 40 through door 40A in the front of the module 40. Wash module 40 uses water and a surfactant to further remove excess sealant from the outside surfaces of the graphite parts. The positions of the wash module 40 and rinse module 30 can be reversed, so that the graphite parts are first placed in the wash module and then in the rinse module. Also, the washing and rinsing of the graphite pieces could occur in a single module. Alternatively, one of the rinse module 30 and wash module 40 could potentially be eliminated.

After washing, the front door of module 40 is opened and the container of graphite parts is moved along transfer deck 100 to the front of cure module 50 and is loaded into the top portion 52 of module 50 through a front door 58. The front door is then closed and sealed preferably with an inflatable seal. Lower (or bottom) portion 52 of module 50 contains water, which may be preheated, for example, to 90° C. Lower portion 52 has a heating element 60 and top portion 54 has a heating element 62.

Pressure is applied to bottom portion 52, preferably by pumping air into bottom portion 52. This causes the water in bottom portion 52 to move upwards, through pipe 56, and into upper chamber 54 and preferably submerge the graphite parts in the water. Preferably, no pump is used to move water from lower portion 52 to upper portion 54. Further, water can be added to upper portion 54 in any suitable manner and from any suitable source, such as from a water tank alongside of or above upper portion 54.

When the graphite parts in upper portion 54 are submerged in water, upper portion is pressurized by any amount from 1 Bar to 20 Bars or more, and preferably an amount exceeding 1 Bar. The temperature of the water in upper portion 54 is also preferably raised/maintained above its boiling point at 1 Bar, such as any amount from 100° C. to 225° C., or higher, although the temperature could also be any amount from 90° C.-100° C. By raising the temperature of the water, the sealant cures faster. The amount of pressure and temperature for each graphite product cured may vary depending on the type of graphite and/or parts' thickness, shape, and size.

Examples include changing the over pressure during the cure step or utilizing superheated water instead of what is normally used specified (90° C.).

Vacuum Impregnation Module 20 Function:

Graphite plates (or "plates", "parts" or "pieces") are placed into a holding carriage (or "basket" or "container"). The carriage is minimalist to prevent damage to the plates and help with the uniformity of sealant coverage. The sealant should preferably only seal the porosity inside of the plate and recovery. Recovery is a term used to describe a part that is sealed with sealant. A graphite casting or graphite plate that is too porous cannot be used so the part is "recovered" to be used in manufacturing. The graphite plates are processed through module 20 in which the plates are subjected to a vacuum of approximately 6.5 mBar (pure vacuum) to 27 mBar. This is accomplished using, for example, a 10-12 HP vacuum pump that draws vacuum on module 20. Via a ball valve, as an example, a sealant is introduced via vacuum transfer into an upper chamber of module 20 in which graphite pieces (here they are plates) are positioned. A vacuum is drawn on the upper chamber and that siphons liquid sealant from a lower reservoir to the upper chamber. After the siphoning of sealant into the upper chamber, the parts are immersed in the liquid sealant, the vacuum is adjusted to about 6.5 mBar. Note: the siphoning effect causes the vacuum to drift up to −100 mBar so the vacuum is drawn back down to about 6.5 mBar. A vacuum of 6.5 mBar, or an amount from 0-27 mBar, is drawn on the graphite plates while they are submerged in the liquid sealant. The vacuum is drawn on dry (or raw) parts first prior to siphoning the sealant in order to draw air out of the graphite parts, and then the plates are subjected to an over pressure of approximately 5.5 Bar. 3.0 Bar to 8.5 Bar is a typical range. The hydraulic effect of overpressure helps to push the sealant into the porosity of the plates.

Rinse Module 30 Function:

The next step is to subject the plates to a rinse module in which the plates are subjected to a flooding style rinse. Ideally, the rinse process removes all excess sealant from the surface of the graphite plates. The goal is to clean excess sealant from the surface of the graphite parts using a water shearing action.

There is a shuttle drain in the bottom of the process modules 20, 30, 40, and 50. The rinse (and cure) modules 30 and 50 as shown have a lower water reservoir and an upper process chamber above the water reservoir. A high-volume water pump is used to move water from the lower water reservoir to the upper process chamber to a pre-defined level (usually over the container (or "basket") holding the graphite plates so that the plates are immersed in the water).

Once that level is achieved, the shuttle opens and drains about 60% of the water from the upper chamber of module 30 to create a shearing/stripping effect of the water on the surface of the graphite plates to strip the sealant from the outer surfaces. The water fills from the bottom of the module, followed by a preprogrammed series of drain sequences to strip the sealant. The number of fills and drains depends on the number of plates being processed between the water and the sealant used.

A surfactant may be used, which is preferably a non-ionic surfactant that is mixed in a concentration of 10%-15% with the rinse water or the wash water. This is introduced into module 30 or 40 via a dosing unit that involves tuning the levels of chemicals included to a batch or process stream to maintain a set concentration. This is preferably accomplished by monitoring the process using on-line instrumentation that automatically controls chemical dosing to maintain appropriate levels without over- or under-dosing. to aid in the rinsing of the plates. The rinse is successful when there is no sealant or surfactant residue visible on the outside of the part Wash Module 40 Function:

The graphite plates are then subjected to wash module 40 in which a flooding-style wash process is utilized, wherein process water preferably fills from the bottom of module 40. The uncured graphite plates are fragile, and a pump over (water coming from the top) of the process water can damage the plates, so module 40 preferably fills from the bottom gradually. The container holding the plates is also rotated at 4 RPM by 60 degrees in either direction (clockwise or counter-clockwise) to help move the plates in the carriage to ensure good washing, followed by a series of drain sequences. One preferred number of washing steps is 5, however, the number of washing steps is dependent on the part. The drain sequences in module 40 strip residual excess sealant and surfactant from the outer surface of the graphite plates using a shearing action. The wash is successful when there is no sealant or surfactant residue visible on the outside of the part.

Cure Module 50 Function:

The cure module in a preferred embodiment comprises a two-chamber unit in which a lower chamber 52 modules water heated to an amount from 87° C. to 95° C., and most preferably about 90° C., and the lower chamber 52 is maintained at a pressure of any amount from 1 Bar to 14 Bar. Heat is maintained in the lower chamber 52 until the transfer of water from the lower module 52 to the upper module 54. Once the transfer of water from the lower chamber 52 to the upper chamber 54 is complete, a secondary heater 58 maintains the process temperature (e.g. superheated water) in the upper chamber 54. The temperature is the upper chamber 54 may be from 90° C.-225° C. or greater, or from 90° C. and 135° C., or from 100° C. to 225° C. or greater. At the same time the upper chamber 54 is pressurized to any amount from 1 Bar to 20 Bar or more, or preferably above atmospheric pressure to any amount from 1.1 Bar to 20 Bar or more. The graphite plates are added to the upper chamber before the cycle begins.

System sequence of operations to prepare the finished graphite plates:

Vacuum Impregnation Module 20 Process Sequence:

(1) An operator or robot (if equipped) pushes a carriage into a vessel.

(2) An operator activates a start switch.

(3) A vacuum pump turns on.

(4) A door closes to seal module 20 with the plates inside.

(5) A seal on the module 20 door inflates to a program logic controller (PLC) controlled setpoint. The pressure of the door seal is preferably 10 PSI above the pressure setpoint of module 20. Example: if the module 20 pressure setpoint is 5.5 Bar, the door seal setpoint is 6.2 Bar.

(6) Reservoir and module 20 vent valves close and a sealant transfer valve closes.

(7) The reservoir vacuum valve opens. Drawing vacuum on the reservoir conditions the sealant and makes the transfer less turbulent. If there is no vacuum, the sealant may foam as the transfer to the upper chamber occurs due to the differential in pressure of going from atmospheric pressure to what is close to a pure vacuum in the upper chamber in which the plates are positioned. Drawing vacuum helps to remove air that enters the sealant during the transfer from the lower module to the upper module and back again.

(8) The vessel vacuum valve. The vessel vacuum is tied to the reservoir via a 4" butterfly valve. The lower reservoir holds, maintains and cools the sealant to 22° C. in between cycles. The upper module is a ASME certified process chamber.

(9) The reservoir vacuum valve closes when vacuum reaches the PLC controlled set point. The vacuum setpoint is variable, but typically it is 6.5 mBar.

(10) The vessel vacuum valve closes when the vacuum in the upper chamber reaches a human-machine interface (HMI) controlled set point. The vacuum setpoint is variable, but typically it is 6.5 mBar.

(11) The vessel vacuum is maintained in the upper chamber for a dry vacuum set time. The time is part dependent, e.g., if the porosity of a part is less than a few microns, the hold time is longer but typically this is only 1 second of hold time. A longer hold time gives air more time to escape the porosity

(12) The transfer valve opens.

(13) The recovery valve opens for an HMI controlled time to recover sealant from the vessel door drip pan. The reservoir vacuum is used to recover the sealant from the front drip pan. The set time is 2 seconds.

(14) The reservoir vent valve opens after a program logic controller (PLC) controlled delay to allow air to enter the reservoir so the sealant transfers properly. This allows air to take the volumetric space the sealant occupied to facilitate the transfer.

(15) The vessel sealant level sensor turns "on" when the sealant reaches the proper level in the upper chamber.

(16) The transfer valve and reservoir vent valves are closed.

(17) A wet vacuum of about 6.5 mBar is applied to the upper chamber in which the parts are preferably covered in (immersed in) sealant. The vacuum is pulled on the plates for an HMI controlled time. Vacuum hold time is defined in the HMI by the operator. Typically, the time is 1 second but can be any suitable time.

(18) The vacuum valve is closed.

(19) The pressure valve is opened.

(20) The pressure valve closes when the pressure reaches a set point, such as 5.5 Bar and determined via a pressure transducer (sensor).

(21) The pressure is maintained in the upper chamber for a pressure hold time, which allows for overpressure to drive the sealant into the porosity of the plate for a longer period. The hold time is any suitable time period for the type, size, shape, and thickness of part.

(22) The vessel vent valve opens.

(23) The transfer valve opens at a PLC controlled pressure level. This is a safety circuit that requires an atmospheric pressure reading from both the pressure transducer and a zero pressure switch

(24) The reservoir vent valve opens.

(25) Once the sealant transfer to the lower reservoir is completed, the carriage (also called a "container" or "basket" herein) welded steel construction rotates for a controlled time set operator setpoint, which can be any suitable time but is typically 60 CW (clockwise motion)-60 CCW (counter-clockwise motion) from the HMI. The centrifuge carriage first rotates clockwise, and then counterclockwise. This is a step to help recover sealant.

(26) The carriage stops at a home position. Home position is preferably top dead center, which is determined by an incremental encoder

(27) The vessel door seal deflates.

(28) The door opens. Manually. The operator grabs the basket via handle and slides the basket to the rinse module. All subsequent transfers happen in this manner Rinse Module 30 Process Sequence:

(1) An operator or robot (if equipped) transfers the carriage from the vacuum impregnation module to the rinse module.

(2) The operator activates the start switch on the rinse module.

(3) The rinse module door closes with the carriage inside.

(4) A pump starts.

(5) The carriage rotates for a controlled time based on an operator setpoint from the HMI. Longer centrifuge times are generally required for parts with complex geometries. The carriage first rotates clockwise, and then counterclockwise. The number of rotations is developed per customer application and type of part.

(6) The upper chamber fills with water from the lower chamber. Depending on the equipment the amount of water for the fill is typically between 56-75 gallons.

(7) The drain shuttle opens when the water reaches an upper level sensor.

(8) The drain shuttle closes after a PLC controlled delay, which may be 3 seconds.

(9) The drain shuttle opens and closes repeating the sequence until an HMI controlled rinse time ends. The time is typically from 20-500 seconds, and then the drain shuttle remains open. Open drain valve is the safe state.

(10) A dosing unit provides a mixture of surfactant into the lower chamber to maintain the hundreds of gallons in the lower chamber to aid in the plate rinsing process.

(11) A carriage stops at a home position.

(12) The rinse door opens.

(13) The drain shuttle closes.

(14) A water make-up valve opens between cycles if the water level drops below the upper-level switch and then closes once the level switch is on.

Wash Module 40 Process Sequence:

(1) An operator or robot (if equipped) transfers the carriage from the rinse module to the wash module.

(2) An operator activates a start switch.

(3) The wash module door closes.

(4) The wash module pump starts.

(5) The carriage rotates for a controlled time operator set point; first clockwise, and then counterclockwise. This sequence step is developed per customer application. The part should come out clean of the surfactant dosed in the rinse module.

(6) The upper chamber fills with water from the lower chamber.

(7) The drain shuttle opens when the water reaches the upper level sensor in the upper chamber.

(8) The drain shuttle closes after a PLC controlled delay, which can be 1-6 seconds and is triggered by an upper process level sensor that is about halfway up the chamber.

(9) The drain shuttle opens and closes in a repeating sequence until an HMI controlled rinse time that is set based on part volume and cleanliness of the parts ends, and then the drain shuttle remains open.

(10) A dosing unit provides a mixture of surfactant into the tank to aid in the plate washing process.

(11) A carriage stops at a home position.

(12) The door opens.

(13) The wash module drain shuttle closes.

(14) A water make up valve opens between cycles if the water level drops below an upper level switch and then closes once the level switch is on.

Cure Module 50 Process Sequence:

(1) An operator or robot (if the system is equipped with a robot) transfers the carriage from the rinse module to the cure module.

(2) An operator activates a start switch.

(3) The cure module 50 door closes with the carriage inside.

(4) The lower water tank 52 begins to pressurize.

(5) A transfer valve opens, and water begins to transfer to the upper chamber 54.

(6) The transfer valve closes when the water reaches an upper-level sensor in the upper chamber.

(7) A water reservoir vent valve opens, bringing the lower water tank 52 under the upper (process) chamber 4 back to atmospheric pressure.

(8) The water is held in the upper chamber 54. Due to the low conductivity of graphite, it takes time to transfer sufficient energy to raise the core temperature of the graphite parts while the pressurization of 1 Bar to 20 Bar or more, or 1.1 Bar to 20 Bar or more, of the upper chamber 54 takes place.

(9) An upper chamber 54 heating element is used to maintain a process temperature of a preferred minimum at any amount from: 90° C. to 135° C., or 90° C. to 100° C., or 100° C. to 225° C. or more.

(10) Once the HMI controlled cure time ends (the time may be determined by lab testing) a transfer valve opens to drain the water from the upper chamber so the parts can be removed.

(11) Once the water level is confirmed via a level sensor to be in the lower reservoir 52, the module 50 door opens and the carriage with the parts cured graphite is removed.

(12) A water make-up valve opens between cycles if the water level drops below the upper level switch, then closes once the water level switch is on.

Prior Art Cure Module:

FIGS. 6 and 7 depict a prior-art cure module 1. Cure module 1 is a vessel with an upper chamber 2 and a lower chamber 3. Water is placed in lower chamber 3 and heated and maintained at about 90° C. Parts that have been impregnated with sealant, and then rinsed and washed, are positioned in upper chamber 2 through door 4. Door 4 is closed and water from the lower chamber 3 is pumped (using a pump) into upper chamber 2 to immerse the graphite parts in the 90° C. water. Heat from the water causes the sealant to cure. The water is then drained from upper chamber 2 and the graphite parts with cured sealant are removed. This prior-art process takes about 45 minutes to 6 hours to cure the sealant in the graphite parts.

Exemplary parameters for a process performed by the equipment of this disclosure follow:

| | Exemplary Value for Graphite Parts | Standard Value for Non-Graphite Parts |
|---|---|---|
| Vacuum Impregnation Module | | |
| Vacuum Level (mBar) | 6.5 mBar | 6.5 mBar |
| Dry Vacuum Hold (Seconds) | 600 | 1 |
| Wet Vacuum Hold | 600 | — |
| Pressure Level (BAR) | 5.5 | 5.5 |
| Pressure Hold Time | 900 | 1 |
| Sealant Temperature ° C. | 21 | 21 |
| Upper Chamber Volume (Liters) | 212 | 212 |
| Volume Lower Chamber (Liters) | 371 | 371 |
| CW/CCW Rotation (RPM) | 150 | 150 |
| Overall Cycle (seconds) | 600 (goal) | 220 |
| Rinse/Wash Modules | | |
| Upper Chamber Volume (Liters) | 264 | 264 |
| Lower Chamber Volume (Liters) | 600 | 600 |
| Temperature ° C. | 21 | 21 |
| CW/CCW Rotation (RPM) | 0 | 11 |
| Surfactant Dosing | Yes | No |
| Cycle Time (seconds) | Sub 600 | Sub 220 |

-continued

|  | Exemplary Value for Graphite Parts | Standard Value for Non-Graphite Parts |
|---|---|---|
| Cure Module |  |  |
| Upper Chamber Volume (Liters) | 189 | 264 |
| Lower Chamber Volume (Liters) | 530 | 600 |
| Upper Chamber Temperature ° C. | Super Heated | — |
| Lower Chamber Temperature ° C. | 90 | 90 |
| Over Pressure (Bar) | ATM< | — |

The device features sensors that check for temperatures and pressure.

Exemplary Graphite Piece Characteristics

The qualifier is a chloroform extraction test. The process (or method or procedure) for a standard mode is described as follows: Equilibrium at 35° C., isothermal for 1 min., ramp 10° C./min to 190° C.

Viscosity of the Liquid Sealant

A Zahn viscosity cup method is used to measure the viscosity of the sealant. The Zahn cup is completely lowered below the sealant surface in a beaker. The viscosity cup is lifted out of the sealant and a timer is started. The timer is stopped when the sealant is completely drained from the viscosity cup. The current viscosity specification is between 20 to 30 seconds. Since viscosity affects sealant uptake and void fill, higher viscosity resins may not function properly. —the viscosity of the sealant is important as dictated by Poiseuille law or equation.

While viscosity can be measured utilizing a Zahn cup, it is not the most accurate. The preferred method is to use a Brookfield viscometer, which will provide a viscosity measure in centipoise (cps). The sealant is 5 cps-15 cps @ 25° C. when measured on a 00 spindle.

Curing Profile, DSC

The curing profile of the sealant is measured by Q20 TA Instruments Differential Scanning calorimetry (DSC) tool or equivalent. This measurement is performed on sealant samples in order to determine exothermic reactions from curing. The tool measures the heat flow of a sealant sample, yielding results which include the change in enthalpy ($\Delta H$). DSC can quantify the heat released during the reaction, thus providing information about the curing mechanism.

The sealant sample should be run under a nitrogen flow of 50 mL/min. The mass of the sealant added to the pan should be between 10 and 15 mg. To minimize the sealant wicking up the sides of the specimen pan, an embossed graphite plate or flat blank (die punch a 4 mm diameter sample) can be placed at the bottom of the pan to soak up the sealant to allow more contact with the pan and furnace. The sealant sample should be sealed inside DSC pans (hermetic lids are preferred) and then loaded into a DSC chamber.

One exotherm peak suggests that only the desired reaction is occurring. This is generally preferred because the cross-linking reaction is completed in one step.

An exotherm peak with one or more shoulders, or with a small peak, constitutes needs further investigation (NH). Small exotherms could suggest residual monomers are unreacted, meaning the initial curing was ineffective, or thermal degradation Two or more distinguishable exotherm peaks may be something to evaluate further. It may involve adjusting the cure temperature or activator concentration to help ensure the sealant is fully cured at the specified temperature.

An exotherm temperature that significantly deviates from the current production sealant temperature would constitute a failure. A higher temperature (greater than 100° C.) would not be achievable in the current water curing system.

Gel Time

Gel time test is used to estimate whether the liquid sealant is curing within the expected curing profile. If the results are out of the specification target, the concentration of activator would be adjusted. A metal wire, culture test tube, hot water bath, and timer are required to perform the gel test. The metal wire is placed into the culture tube so that a portion remains outside of the tube and is long enough to hold. A culture tube is than filled with sealant. The hot water bath is preferably about 90° C.±1° C. and the tube with sealant is placed into the hot water bath. The water level in the bath should be higher than or equal to the sealant level in the tube in order to thoroughly heat the sealant. After about 90 seconds the wire is lifted. If the entire tube lifts with the wire, the sealant has cured. If the tube does not lift the sealant has not cured and the wire is placed back into the tube. Then an operator can check every 3 seconds (by lifting the wire) until the sealant has cured and note the time it took for the sealant to cure. The current specification target for gel time of the sealant is 1.6 to 2.4 minutes, although it could be any suitable time.

Bipolar Plates (1) Glass Transition Temperature (Tg), DMA.

Glass transition temperature (Tg) is the temperature at which the liquid sealant polymer structure transitions from glassy to rubbery. This temperature was evaluated to ensure the mechanical stability of sealant-impregnated graphite at FC operating conditions. A three-point bend test on a dynamic mechanical analyzer (DMA) was performed to determine the Tg of impregnated graphite samples. The procedure is based on ASTM D7028 and ISO 6721 guidelines, but any suitable procedure may be utilized.

A strain controlled module was used with a heating rate of 2° C./min. to increase the temperature from 25° C. to 210° C. According to ASTM D7028, Tan δ peak is defined as Tg in the presented results. The target to ensure materials are stable at FC operating condition is Tg>120° C.

(2) Degree of Cure Via DSC.

The degree of the liquid sealant of resins can be measured by Q20 TA instruments differential scanning calorimetry (DSC) tool or other suitable methods. The purpose of this test is to make sure the sealant inside the graphite plates is fully cured using this procedure. A 4 mm diameter sample of the graphite plate with sealant is die punched from the graphite plate and weighed. Typically, the sample mass range for DSC experiments is between 5 to 20 milligrams, but can be any suitable mass. The sample should be sealed inside a DSC pan and then loaded into the DSC chamber.

Procedure: Equilibrium at 35° C. isothermal for 1 min., ramp 10° C./min to 190° C.

Since different sealants exhibit unique curing characteristics, the DSC assessment is usually conducted for information only. Testing the uncured sealant, one should take note of the following trends and behaviors:

One exotherm peak suggests that only the desired reaction is occurring. This is generally preferred because the cross-linking reaction is completed in one step.

An exotherm peak with one or more shoulders, or with a small peak, constitutes needs further investigation (NH). Small exotherms could suggest residual monomers are unreacted, meaning the initial curing was ineffective, or thermal degradation.

Two or more distinguishable exotherm peaks may be something to evaluate further. It may involve adjusting the cure temperature or activator concentration to help ensure the sealant is fully cured at the specified temperature.

An exotherm temperature that significantly deviates from the current production sealant temperature would constitute a failure. A higher temperature (greater than 100° C.) may not be achievable in the current water curing system.

(3) Example Method Mode: Standard.

Procedure: equilibrium at 35° C., isothermal for 1 min, ramp 5° C./min to 210° C.

The presence of exotherm peaks would suggest that the sealant is not fully cured and that the sealant is undergoing additional curing. The heat flow versus temperature graph for a fully cured sealant should be a flat line with no peaks. Avoid temperatures beyond the sealant degradation temperature.

MeOH (90:10 should be used to soak the fully cured graphite sheets impregnated with the resin. The graphite sealant sheet soaking takes about 2 hours at room temperature. Dry off the graphite sealant sheets after soaking and measure the final mass of each sheet. Percentage of extractables may be calculated from the difference in mass. Subsequently, GC-MS or GC-FID can be performed on the remaining solvent to determine leachable monomers and contaminants. —the purpose is to detect any uncured monomer in the graphite sheet as these will be extracted in the solvent.

(5) Void Fill Calculation.

Void fill percentage of the impregnated graphite plates should be calculated using the following formula: % void fill=(post weight–pre-weight)/resin density+plate volume–(pre-weight/graphite density).

Pre weight=the weight of plate before impregnation. Post weight=the weight of the graphite plate after impregnation. Plate volume is measured by a water displacement method. The impregnated plate is submerged in a deionized water tank and the volume of the displaced water is measured using a graduated cylinder. Any suitable method, however, may be used.

Example Properties, Test Methods, and Target Valves for a Finished (Cured) Graphite Plate and Test Methods Used to Determine Same Follows:

| Property | Method | Sample dimensions (mm) | Temperature (° C.) | Parameters | Standard Reference | Target |
|---|---|---|---|---|---|---|
| Flexural Strength | Instron 3-pt bending | Plate: 30 × 90 Blank: 10 × 60 | Ambient and 95 | Span length: 40 and 50 mm (blank, plates) Strain rate: 0.01/min | ASTM D790 | >30 MPa. 20 MPa. |
| Electrical conductivity | Through-plane voltage drop | 100 × 100 | Ambient | 1 A/cm$^2$ at 1.4 MPa compression | N/A | >20 mV |
| Hydrophobicity | Wetting angle by optical tensiometer | 100 × 100 | Ambient | Measure on flat surfaces | N/A | >105° |

(4) Extractables on the Cured Graphite Plates.

Refer to ISO 1407:2011 for additional guidance. Recommendation to break graphite plates into small pieces to increase surface area for solvent penetration. Chloroform or solvent can be used to determine the completeness of the sealant cure. If there are uncured monomers that could affect the performance of the fuel cell either through permeability, heat transfer or other properties.

Extractables are measured by the mass loss and GC-MS or GC-FID of the solvent. First, the sealant is cured by cross-polymerization into thin sheets. Thin sheets of graphite (the thickness can vary and can range from 0.2 mm-0.8 mm, or be of any suitable thickness) are first vacuum impregnated with sealant. The impregnated sheets are then thermally cured at the prescribed time and temperature. Once cured, the graphite plates are allowed to cool to room temperature before that are soaked in a solvent. This soak time can vary, and can be any suitable time. Upon completion of the soak, the solvent is analyzed for any uncured monomer. as thicker samples may be more difficult to extract using solvents. After the sheets are completely cured. This is customer specific. An appropriate solvent such as DCM/

Typical Material Targets for a Finished Graphite Sheet Made According to the Method of this Disclosure:

| Property | Unit | Target |
|---|---|---|
| Extractables on graphite sheet with cured sealant | Weight % | <10% of the weight of the finished graphite sheet |
| Cure profile (Time/Temp) | Min | <100 min, <100° C. |
| Glass transition temperature (3-pt bend) | Celsius | Tg > 120° C. (Based on maximum FC temperature) |
| Gel ("Cure") time if the sealant at 90° C. water bath | Minutes | 1.5 min < cure time < 3 min |
| Extractables on finished graphite plates | Weight % | <3% |
| Degree of cure (DSC) in plate form | — | No exotherm under 200° C. (avoid temperatures past degradation temperature) |
| Void fill of the finished graphite sheet | % | >95% |
| Gas tightness of the finished graphite sheet | | no leaks |

Some non-limiting examples of this disclosure are as follows:

Example 1: A sealant configured to saturate and seal a graphite plate for use in a hydrogen (H2) fuel cell, wherein the seal is a mixture of ethoxylated monomer.

Example 2: The sealant of example 1 that is configured to cure in 10 minutes or less, or less than 45 minutes, after being impregnated in a graphite sheet and the graphite sheet is pressurized and heated.

Example 3: The sealant of any one of examples 1-2, wherein the cure time is determined by a chloroform extraction test.

Example 4: The sealant of any one of examples 1-3, wherein the extractables in a cured graphite plate impregnated with the sealant are <10% by weight.

Example 5: The sealant of any one of examples 1-3, wherein the viscosity at 25° C. is from 2-30 centipoise (cP).

Example 6: The sealant of any one of examples 1-4 that has a cure profile of <100 minutes at a temperature of <100° C.

Example 7: The sealant of example 6, wherein the cure profile is calculated at atmospheric pressure.

Example 8: The sealant of any one of examples 1-7 that has a gel time in a 90° C. water bath of from 1.5 minutes to 3 minutes.

Example 9: The sealant of any one of examples 1-8 that has an activated resin stability of no curling up to 1 week at 40° C.

Example 10: The sealant of any one of examples 1-9 that provides a flexural strength of impregnated graphite plates at 95° C. of a <30% drop from RT strength.

Example 11: The sealant of any one of examples 1-10 that provides a cured graphite plate impregnated with the sealant a through plane voltage of <20 millivolts (mV).

Example 12: the sealant of any one of examples 1-11 sealant is a methacrylate-based monomer.

Example 13: The sealant of any of examples 1-12 that has a viscosity of 12 centipoise.

Example 14: The sealant of any one of examples 1-13 that contains no acid.

Example 15: The sealant of any one of examples 1-14 that includes a trifunctional monomer.

Some further non-limiting examples of this disclosure are as follows:

Example 1: A method of making a graphite plate impregnated with a sealant that comprises the steps of increasing the cure temperature and increasing the cure pressure.

Example 2: The method of example 1 that further includes the step of measuring extractables by a mass loss of solvent.

Example 3: The method of example 2, wherein the extractables are further measured by one or both of the GC-MS and GC-FID of the solvent.

Example 4: The method of any one of examples 1-3 that further includes the step of curing the graphite plate after being impregnated with the sealant.

Example 5: The method of any one of examples 1-4, wherein a solvent is used, and the solvent is DCM/MeOH.

Example 6: The method of example 5, wherein the solvent is 90% DCM and 10% MeOH.

Example 7: The method of any one of examples 1-6 that further includes the step of soaking graphite sheets in the sealant.

Example 8: The method of example 7, wherein the graphite sheets are fully immersed in the sealant during the soaking step.

Example 9: The method of any one of examples 7-8, wherein the soaking step lasts about 2 hours.

Example 10: The method of any one of examples 7-9, wherein the soaking step is performed at a room temperature from 65° F.-80° F.

Example 11: The method of any one of examples 9-10 that further includes the step of rinsing the graphite sheets.

Example 12: The method of example 11 that further includes the step of drying the graphite sheets after they have been removed from the sealant bath.

Example 13: The method of any one of examples 7-12 that further includes the step of washing the graphite sheets.

Example 14: The method of any one of examples 7-16 that further comprises the step of measuring the mass of each graphite sheet.

Example 15: The method of any one of examples 7-14 that further includes the step of calculating the mass percentages of extractables for each graphite sheet.

Example 16: The method of example 15, wherein the mass percentage of extractables is calculated by subtracting the weight of the graphite sheets after drying from the weight of the graphite sheets before drying.

Example 17: The method of any one of examples 7-16, wherein a step of GC-MS or GC-FID is performed on the remaining solvent to determine leachable monomers and/or contaminants in the remaining solvent.

Example 18: The method of any one of examples 1-17, wherein the viscosity of the sealant is measured using a Zahn viscosity cup.

Example 19: The method of example 18, wherein the viscosity is measured at atmospheric pressure and a temperature of 65° F.-80° F.

Example 20: The method of any one of examples 1-22 that further includes the step of mixing a monomer with an activator to obtain liquid sealant.

Example 21: The method of example 20, wherein the step of mixing includes mixing by weight percentage 80%-92% monomer with 8%-20% activator.

Example 22: The method of any one of examples 20-21, wherein the sealant is cured in the graphite sheet at greater than atmospheric pressure.

Example 23: The method of any one of examples 20-22, wherein the sealant is cured in the graphite sheet at a temperature of 100° C.-225° C. or more.

Example 24: The method of example 23, wherein the sealant is cured at 90° C.-100° C.

Some further non-limiting examples of this disclosure are as follows:

Example 1: A method for forming an impregnated graphite sheet configured for use in a hydrogen (H$_2$) fuel cell, the method comprising the steps of:

(a) Impregnating a sheet of graphite with sealant;

(b) heating the graphite sheet to cure the sealant;

(c) adding a solvent to the thin sheet of graphite has been added; and (d) determining the final mass of the solvent in the thin sheet.

Example 2: The method of example 1, wherein the solvent is DCM/MeOH.

Example 3: The method of example 2, wherein the solvent is DCM/MeOH in a weight percentage of 90:10.

Example 4: The method of any one of examples 1-3, wherein the graphite sheet is immersed in the sealant when impregnated.

Example 5: The method of examples 4, wherein the graphite sheet is immersed in the sealant for 1.5-2.5 hours.

Example 6: The method of example 4, wherein the graphite sheet is immersed in the solvent for 2 hours.

Example 7: The method of any one of examples 1-6 that further includes the step of measuring the percentage of extractables of the solvent in the graphite sheet.

Example 8: The method of example 7, wherein the step of measuring the percentage of extractables includes the step of measuring mass difference in mass of the graphite sheet after it is removed from the solvent to the mass of the graphite sheet after being dried.

Example 9: The method of any one of examples 1-8, wherein the amount of extractables is determined by a GC-MS or GC-FID of the remaining solvent.

Example 10: The method of any one of examples 1-9 that further includes measuring the viscosity of the sealant.

Example 11: The method of example 10, wherein the viscosity is measured using a Zahn viscosity cup.

Example 12: The method of example 11 that further includes the step of placing the sealant in a beaker, wherein the sealant in the beaker has a top surface.

Example 13: The method of example 12, wherein the Zahn viscosity cup is positioned in the beaker below the top surface.

Example 14: The method of any one of examples 12-13 that further includes removing the Zahn viscosity cup from the beaker and draining the sealant from the Zahn viscosity cup.

Example 15: The method of any one of examples 13-14, wherein the resin is drained within 20-30 seconds.

Example 16: The method of any one of examples 1-15, wherein the sealant comprises a curing profile.

Example 17: The method of examples 16, wherein the curing profile of the sealant is measured by a differential scanning calorimetry (DSC) tool.

Example 18: The method of any one of examples 15-17, wherein the curing profile is used in order to determine exothermic reactions from curing.

Example 19: The method of example 17, wherein the DSC tool measures the heat released during the curing reactions.

Example 20: The method of any one of examples 1-19, wherein a sealant sample is run under a nitrogen flow of 50 mL/min.

Example 21: The method of any one of examples 1-20 that further includes the step of adding sealant into a pan.

Example 22: The method of example 21, wherein 1-15 mg of sealant is added to the pan.

Example 23: The method of any one of examples 21-22 that further includes the step of placing a graphite plate in a bottom of the pan.

Example 24: The method of example 23, wherein the graphite plate is either embossed or is a flat blank.

Example 25: The method of example 24, wherein the graphite plate contains openings.

Example 26: The method of any one of examples 21-26 that further includes the step of curing the sealant inside of the pan.

Example 27: The method of example 26 that further includes the step of loading the pan into a DSC chamber.

Example 28: The method of example 27, wherein the temperature inside of the DSC chamber is maintained at 35° C.

Example 29: The method of example 28, wherein the temperature inside of the DSC chamber is maintained at 35° C. for 1 minute.

Example 30: The method of example 29, wherein after the 1 minute, the temperature inside of the DSC chamber is raised to 190° C.

Example 31: The method of example 30, wherein the temperature is raised at a rate of 10° C./min.

Example 32: The method of any one of examples 1-31 that further includes the step of conducting a gel time test configured to determine whether the resin is curing within the proper time.

Example 33: The method of example 32, wherein if the gel time is too long, the method is adjusted to add more activator to the resin.

Example 34: The method of example 33, wherein the step of conducting the gel time test comprises the steps of (a) placing a metal wire inside of a culture tube, (b) placing resin inside of the culture tube, and (c) placing the culture tube in a water bath, wherein the water bath is maintained at 90° C.+/−1° C., and wherein the resin level in the tube is beneath the surface of the water bath.

Example 35: The method of example 34 that further comprises the steps of maintaining the culture tube in the water bath for 90 seconds.

Example 36: The method of example 36 that further includes the step of an operator grasping and lifting the metal wire.

Example 37: The method of example 36, wherein if lifting the wire lifts the culture tube, the resin is cured and if lifting the wire does not lift the culture tube, the resin is not cured.

Example 38: The method of example 37, wherein if the resin is not cured, the wire is placed back into the resin in the culture tube.

Example 39: The method of any one of examples 37-38 that further includes the step of lifting the wire until the culture tube lifts when the wire is lifted.

Example 40: The method of any one of examples 34-39 that further include the step measuring the time it takes for the resin to cure.

Example 41: The method of any one of examples 34-40, wherein the target cure time is from 1.6 to 2.4 minutes.

Some further non-limiting examples of this disclosure are as follows:

Example 1: An impregnated graphite plate for use in a hydrogen ($H_2$) fuel cell, wherein the impregnated graphite plate comprises graphite impregnated with a cured sealant, and the impregnated graphite plate has a glass transition temperature (Tg) of greater than 120° C.

Example 2: The impregnated graphite plate of example 1, wherein the glass transition temperature is determined by utilizing a three-point bend test according to ASTM D7028 and ISO 6721.

Example 3: The impregnated graphite plate of example 2 that utilizes a strain-controlled module with a heating rate of 2° C./min to raise the temperature from 25° C. to 210° C.

Example 4: The impregnated graphite plate of any one of examples 1-3, wherein the degree of cure of the sealant inside of the plate is determined.

Example 5: The impregnated graphite plate of example 4, wherein the cure is determined by taking a 4 mm diameter sample from the graphite plate and weighing it.

Example 6: The impregnated graphite plate of example 5, wherein the sample mass is from 5 to 20 milligrams (mg).

Example 7: The impregnated graphite plate of any one of examples 1-6 that further includes the step of calculating the void fill.

Example 8: The impregnated graphite plate of example 7, wherein the void fill is calculated by (a) obtaining a weight of the graphite plate prior to impregnation with the polymer, (b) obtaining a weight of the graphite plate after impregnation, (c) obtaining a volume of the plate.

Example 9: The impregnated graphite plate of any one of examples 1-8, wherein the void fill is >95%.

Example 10: The impregnated graphite plate of any one of examples 1-9, wherein the flexural strength is >20 mPa.

Example 11: The impregnated graphite plate of any one of examples 1-9, wherein the flexural strength is >20-30 mPa.

Example 12: The impregnated graphite plate of any one of examples 1-11, wherein the electrical conductivity is <20 mV.

Example 13: The impregnated graphite plate of any one of examples 1-12, wherein the hydrophilicity is <105° C.

Example 14: The impregnated graphite plate of any one of examples 1-13, wherein the extractables of the impregnated graphite plates are <3% by weight.

Example 15: The impregnated graphite plate of any one of examples 1-14, wherein the degree of cure of the resin on the impregnated graphite plate is such that there is no exotherm under 200° C.

Example 16: The impregnated graphite plate of any one of examples 1-15, wherein the impregnated graphite plate has a gas tightness of no leaks.

Some further non-limiting examples of this disclosure are as follows:

Example 1: A cure module for curing a graphite sheet impregnated with sealant, wherein the cure module comprises a first chamber and a second chamber, wherein the first chamber comprises heated water, and the second module comprises graphite plates saturated with sealant, a transfer valve positioned between the first chamber and the second chamber, wherein the transfer valve is configured to permit the passage of water between the first chamber and the second chamber when the valve is open, a pressure source in communication with the first chamber and configured to pressurize the first chamber, and a heating source in communication with the second chamber and configured to heat the second chamber.

Example 2: The cure module of example 1, wherein the first chamber is below the second chamber.

Example 3: The cure module of any one of examples 1-2 that further includes a second heater in communication with the first chamber and being configured to heat the water.

Example 4: The cure module of any one of examples 1-3, wherein the pressure source is configured to pressurize the water in the first chamber sufficient to move at least some of the eater into the second chamber when the transfer valve is open.

Example 5: The cure module of any one of examples 1-4, wherein the second chamber is maintained at atmospheric pressure.

Example 6: The cure module of any one of examples 1-5, wherein the first heater is configured to maintain the water at a temperature of 90° C.+/−1° C.

Example 7: The cure module of any one of examples 1-6, wherein the second heater is configured to maintain the water at a temperature of 90° C.+/−1° C.

Example 8: The cure module of any one of examples 1-7, wherein the second chamber is configured to retain the water for 10 minutes or less after the water is transferred from the first module.

Example 9: The cure module of any one of examples 1-8, wherein the valve moves to its closed position after the water has been transferred from the first module to the second module.

Example 10: The cure module of any one of examples 1-9, wherein the valve moves to its open position to permit the water to move from the second chamber to the first chamber.

Example 11: A device for impregnating a graphite sheet with a sealant, wherein the device comprises:
(a) a vacuum impregnation module;
(b) a rinse module;
(c) a wash module; and
(d) the cure module of example 1.

Example 12: The cure module of any one of examples 1-10, wherein the first chamber has a volume of 600 liters.

Example 13: The cure module of any one of examples 1-10 or 12, wherein the second chamber has a volume of 600 liters.

Some further non-limiting examples of this disclosure are as follows:

Example 1: A method for impregnating a graphite sheet with a sealant, wherein utilizing a cure module having a first chamber and a second chamber, the method includes the steps of:
(a) adding one or more graphite sheets to a first chamber of the cure module;
(b) adding heated water to the first chamber;
(c) maintaining the heated water in the first chamber for 10 minutes or less;
(d) removing the water from the first chamber; and
(e) removing the one or more impregnated graphite plates from the first chamber.

Example 2: The method of example 1, wherein an operator activates a start switch.

Example 3: The method of any one of examples 1-2 that further includes the step of closing a cure module door after the one or more impregnated graphite sheets are positioned in the first chamber.

Example 4: The method of any one of examples 1-3, wherein the heated water is in the second chamber before being added to the first chamber.

Example 5: The method of any one of examples 1-4, wherein the second chamber is beneath the first chamber.

Example 6: The method of any one of examples 1-5 that further includes the step of pressurizing the water in the second chamber to move it into the first chamber.

Example 7: The method of example 6, wherein there is a transfer valve between the first chamber and the second chamber, and the transfer valve opens and the heated water transfers to the first chamber.
(a) a transfer valve closes when the water reaches an upper level sensor.
(b) a water reservoir vent valve opens, bringing the reservoir in the lower chamber back to atmospheric pressure.
(c) the water is held in the upper chamber while the pressurization (1 bar to 20 bar) of the upper chamber takes place.
(d) an upper chamber heating element is used to maintain a process temperatures.
(e) once the HMI controlled cure time ends set by operator. Determined by when the sealant is cured, a transfer valve opens.
(f) once the water level is confirmed via a level sensor to be in the lower reservoir, the module door opens.
(g) a water make-up valve opens between cycles if the water level drops below the upper level switch, then closes once the water level switch is on.

Example 8: The process of any one of examples 1-7, wherein, utilizing a vacuum impregnation module, the process further includes the step of impregnating the graphite sheets with sealant.

Example 9: The process of any one of examples 1-8, wherein, utilizing a rinse module, the process further includes the step of rinsing the graphite sheets.

Example 10: The process of any one of examples 1-9, wherein, utilizing a wash module, the process further includes the step of washing the graphite sheets.

Some further non-limiting examples of this disclosure are as follows:

Example 1: A method of curing sealant in a graphite part, wherein the method comprises (a) placing graphite parts saturated with a sealant into a cure module, (b) closing the cure module with the saturated graphite parts inside, (c) adding a heating medium into the cure module to at least partially immerse the graphite parts in the heating medium, (d) raising the pressure in the cure module to above 1 Bar, and (e) maintaining the temperature of the cure module to any temperature from 90° C.-225° C. or higher.

Example 2: The method of example 1, wherein the graphite part is a plate.

Example 3: The method of example 1 or example 2, wherein the sealant is a mixture of ethoxylated monomer.

Example 4: The method of any one of examples 1-2, wherein the sealant is a methacrylate-based monomer.

Example 5: The method of any of examples 1-4, wherein the sealant has a viscosity of 12 centipoise.

Example 6: The method of any one of examples 1-5, wherein the sealant contains no acid.

Example 7: The method of any one of examples 1-6, wherein the sealant includes a trifunctional monomer.

Example 8: The method of any one of examples 1-7, wherein the pressure is raised to any amount from 1.1 Bar to 20 Bar or higher.

Example 9: The method of any one of examples 1-8, wherein the heating medium is water.

Example 10: The method of any one of examples 1-9, wherein the graphite parts are completely immersed in the heating medium.

Example 11: The method of any one of examples 1-10 that is configured to cure the sealant in less than 45 minutes.

Example 12: The method of any one of examples 1-11 that is configured to cure the sealant in 10 minutes or less.

Example 13: The method of any one of examples 1-11 that is configured to cure the sealant in any time from 10 minutes to 40 minutes.

Example 14: The method of any one of examples 1-13, wherein the cure module comprises an upper chamber and a lower chamber.

Example 15: The method of examples 14, wherein the graphite part is positioned in the upper chamber.

Example 16: The method of example 14 or example 15 that further includes the step of pressurizing the lower chamber to move at least some of the heating medium from the lower chamber into the upper chamber.

Example 17: The method of any one of examples 1-16, wherein the graphite part has a void fill of 95% of greater after the sealant is cured.

Example 18: The method of any one of examples 1-17, wherein the graphite part has a gas porosity of zero after the sealant is cured.

Example 19: The method of example 16, wherein the lower chamber is not pressurized after the at least some of the heating medium is moved to the upper chamber.

Example 20: The method of example 16 or example 19 that further includes the step of moving the at least some of the heating medium back to the lower chamber after the sealant is cured.

Example 21: The method of any one of examples 1-20 that further includes the step of saturating the graphite part with liquid sealant before curing the sealant.

Example 22: The method of example 21 that further includes the step of rinsing excess liquid sealant off of the graphite part after saturating it.

Example 23: The method of example 21 or example 22 that further includes the step of washing excess liquid sealant off of the graphite part after saturating it.

Having thus described some embodiments of the invention, other variations and embodiments that do not depart from the spirit of the invention will become apparent to those skilled in the art. Unless expressly stated in the written description or claims, the steps of any method recited in the claims may be performed in any order capable of yielding the desired result.

What is claimed is:

1. A method for curing one or more graphite sheets impregnated with a sealant, the one or more impregnated graphite sheets being cured utilizing a cure module having a first chamber and a second chamber, the method comprising the steps of:
    (a) adding the one or more impregnated graphite sheets to the first chamber of the cure module;
    (b) adding heated water from the second chamber to the first chamber;
    (c) maintaining the heated water in the first chamber for 10-45 minutes at a temperature of 90° C.-225° C. and keeping the first chamber at a pressure above 1 bar to thereby cure the one or more impregnated graphite sheets;
    (d) removing the heated water from the first chamber; and
    (e) removing the one or more impregnated graphite sheets from the first chamber.

2. The method of claim 1 wherein the pressure of the heated water in the first chamber is in a range from 1.1 to 20 Bar.

3. The method of claim 1 that further comprises the step of closing a cure module door after the one or more impregnated graphite sheets are positioned in the first chamber.

4. The method of claim 1, wherein the heated water in the second chamber is at atmospheric pressure before being added to the first chamber.

5. The method of claim 1, wherein the second chamber is beneath the first chamber.

6. The method of claim 1 that further includes the step of pressurizing the water in the second chamber to move it into the first chamber.

7. The process of claim 1, wherein, utilizing a vacuum impregnation module, the process further comprises the step of impregnating the one or more graphite sheets with liquid sealant prior to curing the graphite sheets.

8. The process of claim 1, wherein, utilizing a rinse module, the process further includes the step of rinsing the one or more graphite sheets after they have been impregnated with liquid sealant and prior to curing them.

9. The process of claim 1, wherein, utilizing a wash module, the process further includes the step of washing the one or more graphite sheets after they have been impregnated with liquid sealant and prior to curing them.

10. A method of curing a liquid sealant in one or more graphite parts, wherein the method comprises (a) placing the one or more graphite parts impregnated with the liquid sealant into a cure module, (b) closing the cure module with the impregnated graphite parts inside, (c) adding a heating medium into the cure module to immerse the impregnated graphite parts in the heating medium, (d) raising the pressure in the cure module to above 1 Bar, and (e) raising the temperature of the heating medium in the cure module to any temperature from 90° C. or higher, wherein the heating medium is water.

11. The method of claim 10, wherein the one or more graphite parts are one or more graphite plates for hydrogen fuel cells.

12. The method of claim 10, wherein the liquid sealant comprises a mixture of ethoxylated monomer.

13. The method of claim 10, wherein the liquid sealant comprises a methacrylate-based monomer.

14. The method of claim 10, wherein the liquid sealant has a viscosity of 12 centipoise at 25° C.

15. The method of claim 10, wherein the liquid sealant contains no acid.

16. The method of claim 10, wherein the liquid sealant includes a trifunctional monomer.

17. The method of claim 10, wherein the pressure in the cure module is raised to any amount from 1.1 Bar to 20 Bar.

18. The method of claim 10 wherein the liquid sealant in the impregnated graphite parts is cured in less than 45 minutes.

19. The method of claim 10 wherein the liquid sealant in the impregnated graphite parts is cured in 10 minutes or less.

20. The method of claim 10 wherein the liquid sealant in the impregnated graphite parts is cured in any time from 10 minutes to 45 minutes.

21. The method of claim 10, wherein the one or more graphite parts have a void fill of 95% of greater after the liquid sealant is cured.

\* \* \* \* \*